United States Patent Office 2,884,460
Patented Apr. 28, 1959

2,884,460

DEHYDROGENATION OF ALCOHOLS

Vasili I. Komarewsky, Chicago, Ill., assignor, by mesne assignments, to Heavy Minerals Co., Chicago, Ill., a corporation of Delaware No Drawing. Application October 19, 1955
Serial No. 541,536

3 Claims. (Cl. 260—603)

This invention relates, as indicated, to the dehydrogenation of alcohols, and more particularly to neodymium oxide and samarium oxide as catalysts for dehydrogenation.

It is an object of this invention to provide a method for dehydrogenating alcohols.

It is a further object of the invention to convert alcohols into aldehydes and ketones.

Other objects and advantages of the invention will be apparent as the description proceeds.

To the foregoing and related ends said invention then comprises the features hereinafter fully described, particularly pointed out in the claims, the following description setting forth in detail certain illustrative embodiments of the invention, these being indicative, however, but of a few of the various ways in which the principle of the invention may be employed.

Broadly stated, this invention relates to a process for the dehydrogenation of alcohols employing a catalyst comprising an oxide of a rare earth metal having an atomic weight between 60 and 62.

More particularly, this invention relates to the use of neodymium oxide and samarium oxide as catalysts for the dehydrogenation of alcohols at a temperature within the range of 400° C. to 600° C. at a space velocity of not more than 2.0.

The alcohols which may be dehydrogenated in the processes of the invention are usually primary alcohols, preferably aliphatic, and most desirably acyclic compounds containing from 2 to 12 carbon atoms. Alcohols which may be satisfactorily employed include, for example, straight chain compounds, such as ethyl, n-propyl, n-butyl, n-amyl, n-hexyl, n-heptyl, n-octyl, n-nonyl, n-decyl, n-dodecyl alcohol; branched chain compounds, such as isopropyl alcohol, isobutyl alcohol, tert-butycarbinol, 2-methyl-1-butanol, isoamyl alcohol, and 1,2-dimethyl decanol. Single compounds or mixtures of alcohols may be employed.

The catalyst employed in the dehydrogenation reaction may be either neodymium oxide ($Nd_2O_3$) or samarium oxide ($Sm_2O_3$). These compounds may be prepared by the precipitation of their hydroxides from a solution of their chlorides by treatment with an alkali metal hydroxide, washing with water, and drying at elevated temperatures, for example, in the range from about 100° C. to 650° C. in an atmosphere of inert gas.

In carrying out the dehydrogenation of alcohols, according to the present process, the catalyst as prepared above, is used as a filter in a reaction tube or chamber in the form of pellets or particles of graded size (8 to 10 mesh) and the vapor of the alcohol is passed through the stationary mass of the catalyst particles in the reaction chamber after it has been heated to a proper temperature, usually within the range of from about 400° C. to 600° C., depending upon the alcohol or mixture of alcohols undergoing treatment.

The catalyst tube is usually heated exteriorly to maintain the desired reaction temperature. The pressure employed for the above temperature ranges is usually atmospheric, although subatmospheric pressures may be used in the order of 50 pounds to 100 pounds per square inch.

The space velocity needed for the desired reaction is generally within the range from about 0.1 to 2.0, and usually not more than 2.0. By space velocity is meant that a unit volume of liquid is vaporized and passed through a unit volume of catalyst for a unit of time. For example, a space velocity of 1 is equal to passing 100 ml. of liquid in vapor form through 100 ml. of catalyst for 1 hour.

When the activity of the catalyst begins to diminish it is readily regenerated by the simple expedient of oxidizing with air or other oxidizing gas at a moderately elevated temperature, usually within the range employed in the dehydrogenation reactions. This oxidation effectively removes traces of carbon deposits which contaminate the surface of the particles and decrease their efficiency. It is characteristic of the present types of catalysts that they may be repeatedly regenerated without substantial loss of catalytic potency.

In order to more clearly illustrate my invention, and the preferred modes of carrying out the same into effect, the following examples are given.

Example 1

Neodymium oxide ($Nd_2O_3$) was prepared by precipitation of neodymium hydroxide from a neodymium chloride solution by treatment with sodium hydroxide; the precipitate was washed with water ion free and dried at 105° C. The so-dried cake was broken to 8 to 10 mesh particles and placed in the catalytic tube. The catalysts were activated by gradually heating to 499° C. in a stream of hydrogen or nitrogen. No carrier was employed. The so-prepared catalyst contained at least 98% by weight of neodymium oxide.

Example 2

Samarium oxide ($Sm_2O_3$) was prepared by precipitation of samarium hydroxide from a samarium chloride solution by treatment with sodium hydroxide; the precipitate was washed with water ion free and dried at 105° C. The so-dried cake was broken to 8 to 10 mesh particles and placed in the catalytic tube. The catalysts were activated by gradually heating to 499° C. in a stream of hydrogen or nitrogen. No carrier was employed. The so-prepared catalyst contained at least 98% by weight of samarium oxide.

Example 3

Ethyl alcohol was vaporized and passed through a chamber containing the catalyst prepared in Example 1, at 400° C. and at a space velocity of 0.2. The composition of the exit products contained 50% by weight of aldehyde.

Example 4

Ethyl alcohol vaporized and passed through the catalyst prepared in Example 2, at 400° C. at a space velocity of 0.2 yields about 50% by weight of aldehyde.

Example 5

Dodecyl alcohol vaporized and passed through the catalyst prepared in Example 1, at a temperature of about 400° C. and a space velocity of about 0.2, yields 50% by weight of aldehyde.

Other modes of applying the principle of the invention may be employed, change being made as regards the details described, provided the features stated in any of the following claims or the equivalent of such be employed.

I, therefore, particularly point out and distinctly claim as my invention:

1. A process for dehydrogenation which comprises subjecting an acyclic primary alcohol to the action of a catalyst selected from the class consisting of neodymium oxide and samarium oxide, at a temperature within the range from 400° C. to 600° C., and at a space velocity of not more than 2.

2. The process of claim 1 wherein said catalyst is neodymium oxide.

3. The process of claim 1 wherein said catalyst is samarium oxide.

References Cited in the file of this patent

Lowdermilk et al.: J. Am. Chem. Soc. 52, 3534–3545 (1931).